US010319579B2

(12) United States Patent
Ranish et al.

(10) Patent No.: US 10,319,579 B2
(45) Date of Patent: Jun. 11, 2019

(54) ADAPTER FOR REPLACEABLE LAMP

(71) Applicant: Applied Materials, Inc., Santa Clara, CA (US)

(72) Inventors: Joseph M. Ranish, San Jose, CA (US); Oleg V. Serebryanov, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 15/921,281

(22) Filed: Mar. 14, 2018

(65) Prior Publication Data

US 2018/0204715 A1 Jul. 19, 2018

Related U.S. Application Data

(63) Continuation of application No. 14/546,103, filed on Nov. 18, 2014, now Pat. No. 9,922,815.

(60) Provisional application No. 61/918,451, filed on Dec. 19, 2013.

(51) Int. Cl.

| | |
|---|---|
| ***G02B 27/10*** | (2006.01) |
| ***G01B 11/25*** | (2006.01) |
| ***G02B 5/18*** | (2006.01) |
| ***H01K 1/46*** | (2006.01) |
| ***H01K 1/36*** | (2006.01) |
| ***H01K 1/66*** | (2006.01) |
| ***H05B 3/00*** | (2006.01) |
| ***H01K 1/44*** | (2006.01) |

(52) U.S. Cl.

CPC ................ *H01K 1/46* (2013.01); *H01K 1/36* (2013.01); *H01K 1/44* (2013.01); *H01K 1/66* (2013.01); *H05B 3/0038* (2013.01)

(58) Field of Classification Search

CPC ........................................................ H01K 1/66

See application file for complete search history.

(56) References Cited

U.S. PATENT DOCUMENTS

| | | | | |
|---|---|---|---|---|
| 3,256,507 A | | 6/1966 | Ackerman | |
| 4,570,104 A | | 2/1986 | Janssen et al. | |
| 4,754,195 A | * | 6/1988 | Rasch .................. | H01J 61/827 174/124 R |
| 5,767,486 A | | 6/1998 | Gronet et al. | |
| 6,075,318 A | | 6/2000 | Noll et al. | |
| 6,350,964 B1 | | 2/2002 | Boas et al. | |

(Continued)

FOREIGN PATENT DOCUMENTS

| | | |
|---|---|---|
| CN | 1625794 A | 6/2005 |
| CN | 101292576 A | 10/2008 |

(Continued)

OTHER PUBLICATIONS

Chinese Office Action dated Aug. 2, 2018 for Application No. 201480068623.0.

(Continued)

*Primary Examiner* — Nimeshkumar Patel
*Assistant Examiner* — Jacob R Stern
(74) *Attorney, Agent, or Firm* — Patterson + Sheridan LLP

(57) ABSTRACT

Embodiments of the present disclosure generally relate to an improved adapter for simplified lamps for use as a source of heat radiation in a rapid thermal processing (RTP) chamber. In one embodiment, a lamp assembly is provided. The lamp element includes a capsule having a filament disposed therein, a press seal coupling to the capsule, and an adapter having a receptacle contoured to receive at least a portion of the press seal, wherein the press seal is removably engaged with the adapter.

20 Claims, 8 Drawing Sheets

(56) References Cited

U.S. PATENT DOCUMENTS

| | | | |
|---|---|---|---|
| 6,582,253 | B1 | 6/2003 | Lau |
| 7,509,035 | B2 | 3/2009 | Ranish et al. |
| 8,125,133 | B2 | 2/2012 | Heidbuchel et al. |
| 2003/0076026 | A1 | 4/2003 | Trent et al. |
| 2003/0122484 | A1 | 7/2003 | Vallabhaneni et al. |
| 2004/0156625 | A1 | 8/2004 | Garmer et al. |
| 2005/0218774 | A1* | 10/2005 | Bhagwat .................. H01J 5/48 313/318.01 |
| 2005/0286243 | A1 | 12/2005 | Ranish et al. |
| 2006/0066193 | A1* | 3/2006 | Ranish .............. H01L 21/67115 313/116 |
| 2007/0164649 | A1 | 7/2007 | Knorr |
| 2010/0194260 | A1 | 8/2010 | Sekiguchi et al. |
| 2011/0241530 | A1 | 10/2011 | Korndoerfer et al. |

FOREIGN PATENT DOCUMENTS

| | | | |
|---|---|---|---|
| CN | 100437891 | C | 11/2008 |
| DE | 02013007411 | U1 | 9/2013 |
| GB | 1435979 | A | 5/1976 |
| JP | 2007200806 | A | 8/2007 |
| KR | 10-2005-0067835 | | 7/2005 |
| TW | 200845104 | A | 11/2008 |

OTHER PUBLICATIONS

Chinese Search Report dated Jul. 25, 2018 for Application No. 201480068623.0.

International Search Report and Written Opinion for International Application No. PCT/US2014/066192 dated Feb. 25, 2015.

Office Action for U.S. Appl. No. 14/546,103 dated Apr. 15, 2015.

Final Office Action for U.S. Appl. No. 14/546,103 dated Oct. 28, 2015.

Office Action for U.S. Appl. No. 14/546,103 dated Sep. 27, 2016.

Final Office Action for U.S. Appl. No. 14/546,103 dated Feb. 9, 2017.

Taiwan Office Action dated Nov. 20, 2018 for Application No. 103141632.

* cited by examiner

SECTION A-A

ADAPTER FOR REPLACEABLE LAMP

CROSS-REFERENCE TO RELATED APPLICATIONS

This application is a continuation of U.S. patent application Ser. No. 14/546,103, filed on Nov. 18, 2014, which application claims priority to U.S. Provisional Patent Application Ser. No. 61/918,451, filed on Dec. 19, 2013, both of which are herein incorporated by reference.

BACKGROUND

Field

Embodiments of the present disclosure generally relate to an apparatus for thermally processing a substrate. In particular, embodiments of the present disclosure relate to an adapter for lamps used as a source of heat radiation in a rapid thermal processing (RTP) chamber.

Description of the Related Art

During RTP of substrates, thermal radiation is generally used to rapidly heat a substrate in a controlled environment to a maximum temperature of up to about 1350° C. This maximum temperature is maintained for a specific amount of time ranging from less than one second to several minutes depending on the particular process. The substrate is then cooled to room temperature for further processing.

High voltage, e.g., about 40 volts to about 130 volts, tungsten halogen lamps are commonly used as the source of heat radiation in RTP chambers. Current lamp assembly designs include a lamp body, a bulb and a base coupling to the lamp body. The lamp base mates to a receptacle on a printed circuit board (PCB) structure, facilitating easy removal and replacement of the lamp assembly. When the bulb fails, the entire lamp assembly including the base coupling to the lamp body is replaced even though the base itself is functioning properly. Replacement of a functional base due to a faulty bulb causes unnecessary waste and expense.

Therefore, it is desirable to provide an improved lamp design to reduce cost and provide ability to adjust height of the lamps as needed.

SUMMARY OF THE DISCLOSURE

Embodiments of the disclosure generally relate to an improved adapter for lamps used as a source of heat radiation in a rapid thermal processing (RTP) chamber. In one embodiment of the present disclosure, a lamp assembly is provided. The lamp assembly includes a capsule having a filament disposed therein, a press seal coupling to the capsule, and an adapter having a receptacle contoured to receive at least a portion of the press seal, wherein the press seal is removably engaged with the adapter.

In another embodiment, a lamp assembly for use in a thermal processing chamber is provided. The lamp assembly includes a lamp element comprising a capsule having a filament disposed therein, a press seal extending from the capsule, a first filament lead and a second filament lead, the first and second filament leads extend from the filament to a first metal foil and a second metal foil disposed within the press seal, respectively, and a first electrically conductive lead and a second electrically conductive lead, the first and second electrically conductive leads electrically connect the first and second metal foils to respective electrically conductive receptacles formed in a printed circuit board (PCB) structure positioned external to the lamp assembly, and an adapter having an opening at first and second ends thereof, wherein the opening at the first end has a receptacle contoured to receive at least a portion of the press seal, and the receptacle is configured to removably engage with the press seal.

In yet another embodiment, an adapter for a lamp element is provided. The adapter includes an elongate body having a first end and a second end opposing the first end, wherein an opening at the first end has a receptacle contoured to receive at least a seal portion of a lamp element to be removably engaged with the elongate body, wherein the seal portion encapsulates and creates a hermetic seal about a metal foil connected to a filament of the lamp element.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the disclosure generally relate to an improved adapter for lamps used as a source of heat radiation in a rapid thermal processing (RTP) chamber. The improved adapter allows an easy, fast replacement of a lamp element by making the lamp element removably engaged with the adapter so that the lamp element and/or the adapter can be individually replaced. In some aspects of various embodiments of this disclosure, the adapter may be permanently affixed (brazed, welded, interference fit, or glued etc.) in the lamphead assembly. The lamp element is configured to provide sufficient rigidity to handle compressive forces of inserting the lamp assembly into a PCB structure. The adapter may optionally provide a fuse (and/or electrical receptacles for the lamp element) which can be replaced from the side, top, or bottom of the adapter. The adapter provides a receptacle for receiving a portion of the lamp element. The receptacle is contoured and may be coated to aid in directing thermal radiation to the target in a controlled manner. The adapter may provide thermal conductive features and a cooling path to facilitate heat transfer from the lamp element to the outside world. As a result, the lamp can be operated so that critical parts are at a temperature low enough to permit long lamp life. Details of various embodiments are discussed below.

Exemplary Chamber Hardware

Figure 1:
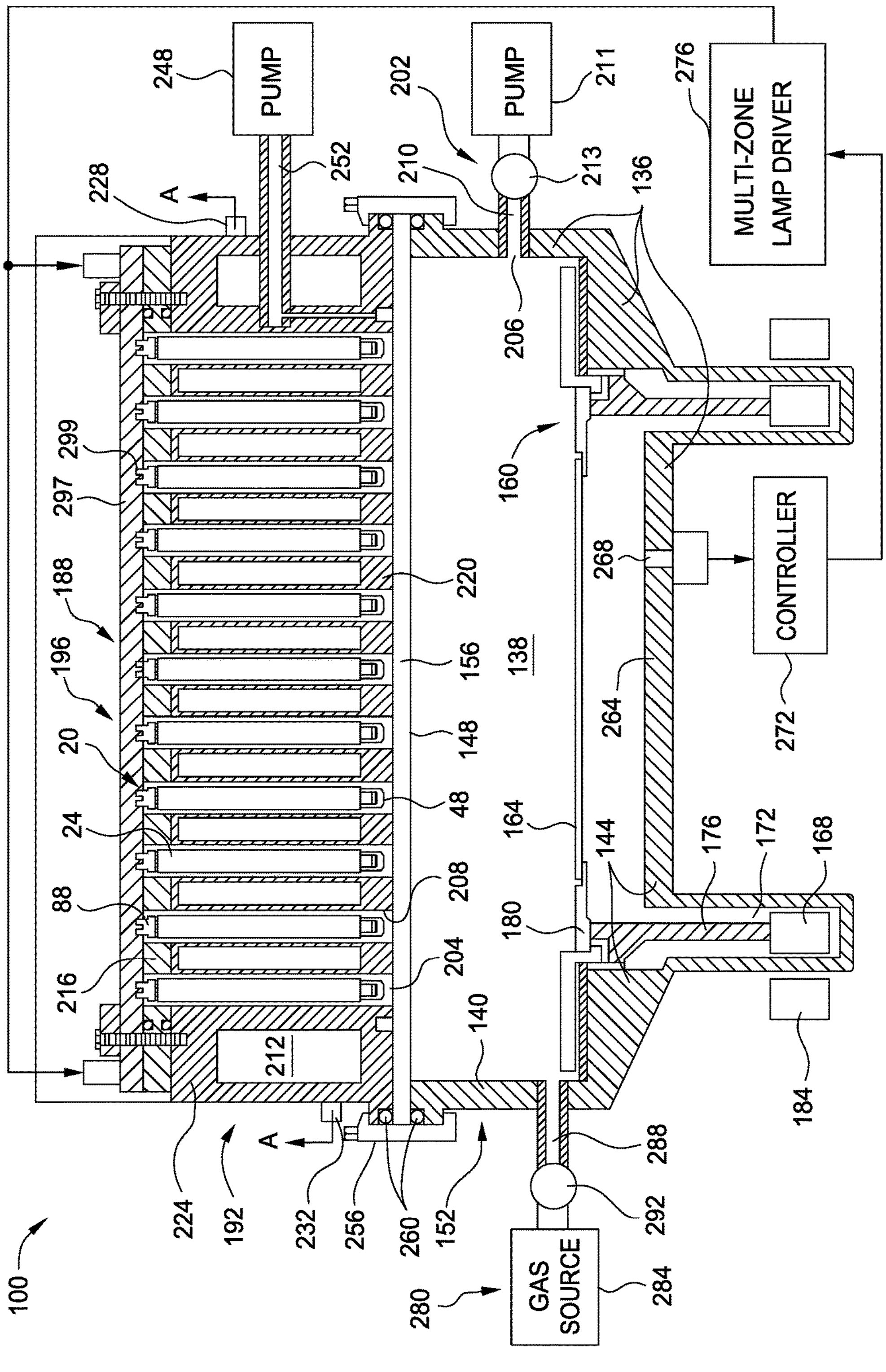
FIG. 1 is a schematic, cross-sectional view of a thermal processing chamber having an array of lamp assemblies.

FIG. 1 is a schematic, cross-sectional view of an RTP chamber 100 in which embodiments of the present disclosure are used. The RTP chamber 100 is capable of providing a controlled thermal cycle that heats the substrate 164 for processes such as, for example, thermal annealing, thermal cleaning, thermal chemical vapor deposition, thermal oxidation and thermal nitridation. It is contemplated that embodiments of the present disclosure may also be used in epitaxial deposition chambers which are heated from the bottom, the top, or both, and also other RTP chambers where bottom heating is used. The RTP chamber 100 includes chamber walls 136 enclosing a process zone 138. For example, the chamber walls 136 enclosing the process zone 138 can comprise sidewalls 140 and bottom walls 144 formed by a main body 152 and a top wall 148 formed by a window 156 resting on the main body 152. The main body 152 may be made of stainless steel, although aluminum and other suitable materials may also be used. The window 156 is made of a material that is transparent to infrared light, such as clear fused silica quartz.

A substrate support 160 holds the substrate 164 during processing in the process zone 138. The substrate support 160 may include a rotatable structure that rotates the substrate 164 during processing. For example, the support 160 may include a magnetically levitated rotor 168 positioned within a channel 172 in the main body 152. The magnetically levitated rotor 168 supports a quartz support cylinder 176, on top of which is a support ring 180 to hold the substrate 164. A magnetic stator 184 located externally to the channel 172 containing the rotor 168 is used to magnetically induce rotation of the rotor 168 in the channel 172, which in turn causes rotation of the substrate 164 on the support ring 180. The substrate 164 may be rotated, for example, at about 100 to about 250 revolutions per minute.

A radiation source 188 directs radiation onto the substrate 164, and can be positioned above the substrate 164, such as in a ceiling 192 of the RTP chamber 100 above the radiation permeable window 156 at the top of the process zone 138. The radiation source 188 generates radiation at wavelengths that heat the substrate 164, such as radiation having wavelengths of from about 200 nm to about 4500 nm. In one embodiment, the radiation source 188 may include a honeycomb array 196 of lamp assemblies 20. The array 196 may include one or more approximately radial heating zones that can be independently modulated to control temperatures across the substrate 164. For example, in one aspect, the radiation source 188 may include 409 lamps divided into 15 radially symmetric zones. Each zone can be independently controlled to provide fine control of the radial profile of heat delivered to the substrate 164. The radiation source 188 is capable of rapidly heating the substrate 164 for thermal processing, for example at a rate of from about 50° C./s to about 280° C./s.

Figure 2:
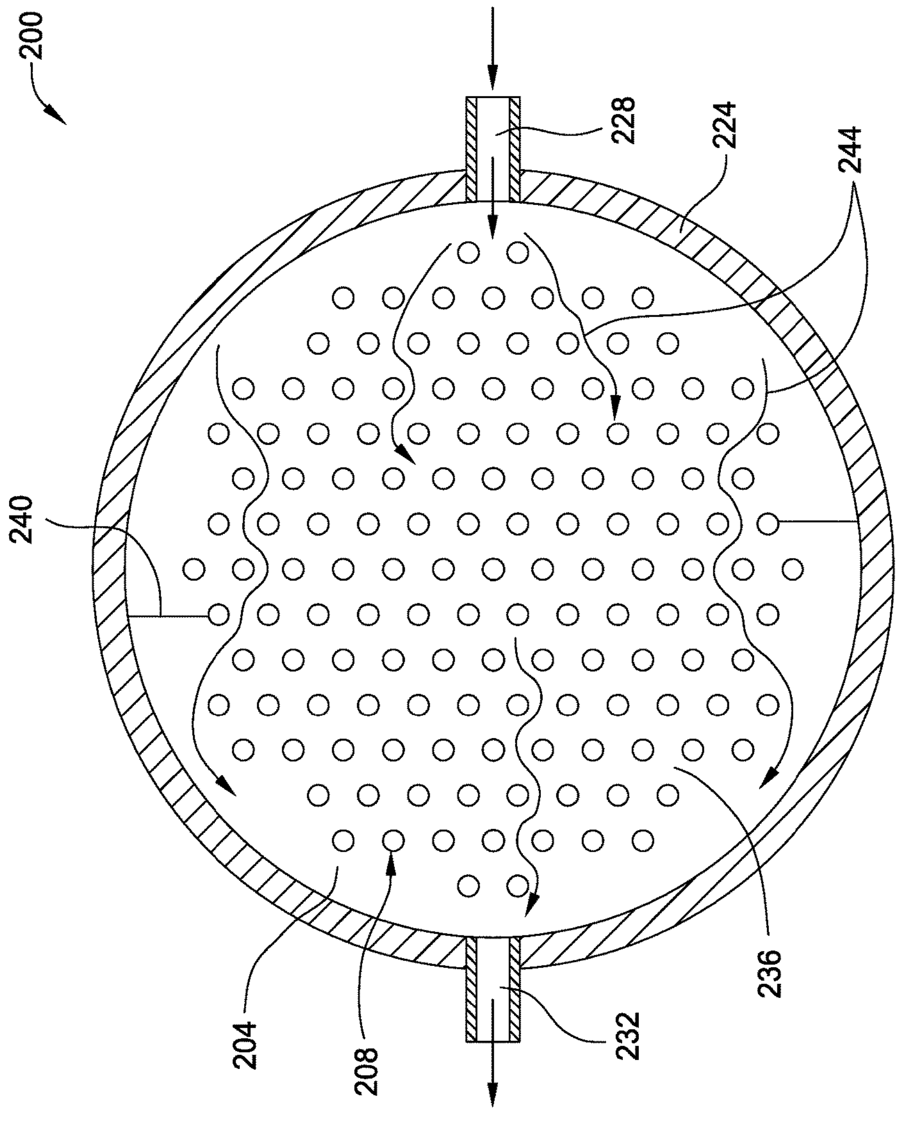
FIG. 2 is a schematic, top view of the array of the lamp assemblies in a cooling chamber of the thermal processing chamber.

Each lamp assembly 20 in the array 196 of lamp assemblies 20 is enclosed in a tubular lamp assembly housing 204. One end of the lamp assembly housing 204 is adjacent to the transmission window 156. The lamp assembly housing 204 may have a reflective inner surface 208 to increase the efficiency of light and heat transfer from the lamp assemblies 20 to the substrate 164. The lamp assembly housing 204 may be enclosed in a fluid cooling chamber 212 defined by upper and lower fluid chamber walls 216, 220 and a cylindrical fluid chamber side wall 224. Clamps 256 secure the main body 152, window 156, and cooling chamber 212 together. O-rings 260 are located between the window 156 and the cooling chamber 212 and between the window 156 and the main body 152 to provide a vacuum seal at those interfaces. A cooling fluid, such as, for example, water, can be introduced into the cooling chamber 212 through a cooling fluid inlet 228 and removed from the cooling chamber 212 through a cooling fluid outlet 232. FIG. 2 illustrates a top view of the array 196 of lamp assemblies 20 in lamp assembly housings 204 in the cooling chamber 212. Cooling fluid travels in the space 236 between the lamp assembly housings 204, and may be directed by baffles 240 to ensure an effective fluid flow to transfer heat from the lamp assemblies 20 in the lamp assembly housings 204. A vacuum pump 248 is provided to reduce the pressure in the lamp assembly housings 204. The vacuum pump 248 is coupled to the lamp assembly housings 204 by a conduit 252 in the cylindrical sidewall 224 and grooves in the bottom wall 144 of the cooling chamber 212.

In some embodiments, a pressurized source (not shown) of a thermally conductive gas, such as helium, may be provided and configured to cool the lamp assembly housing 204 with the thermally conductive gas, thereby facilitating thermal transfer between the lamps assemblies 20 and the cooling chamber 212. The pressurized source may be connected to the lamp assembly housing 204 through a port and a valve. The thermally conductive gas may be introduced in a manner so that the lamp assembly housing 204 (and therefore the lamp assembly 20 disposed therein) is operated under reduced pressure of the thermal conductive gas.

The bottom wall 144 of the main body 152 may include a reflective plate 264 positioned below the substrate 164. One or more temperature sensors 268, such as pyrometers having fiber optic probes, may also be provided to detect the temperature of the substrate 164 during processing. The sensors 268 are connected to a chamber controller 272, which can use their output to determine a power level to supply to individual lamp assemblies 20 and to groups of lamp assemblies 20 in a zone. Each group of lamp assemblies 20 can be separately powered and controlled by a multi-zone lamp driver 276, which is in turn controlled by the controller 272.

A gas supply 280 can provide a process gas into the process zone 138 and control the atmosphere in the RTP chamber 100. The gas supply 280 includes a source 284 of process gas and a conduit 288 having a flow control valve 292 that connects the source 284 to a gas inlet (not shown) in the RTP chamber 100 to provide gas in the RTP chamber 100. An exhaust 202 controls the pressure of gas in the RTP chamber 100 and exhausts process gas from the RTP chamber 100. The exhaust 202 may include one or more exhaust ports 206 that receive spent process gas and pass the spent gas to an exhaust conduit 210 that feeds one or more exhaust pumps 211. A throttle valve 213 in the exhaust conduit 210 controls the pressure of the gas in the RTP chamber 100.

The RTP chamber 100 may further include a printed circuit board (PCB) structure 297 on top of the upper cooling fluid chamber wall 216. The PCB structure 297 may include receptacles 299 configured to receive electrical connectors of the lamp assembly 20. The PCB structure 297 may also include electrical traces and other electrical elements to deliver power and signals to the lamp assemblies 20 from the multi-zone lamp driver 276 and controller 272. Each of the plurality of lamp assemblies 20 is inserted into the PCB structure 297 for electrical connection through the driver 276 to a power supply source (not shown).

Exemplary Lamp Assembly

Figure 3:
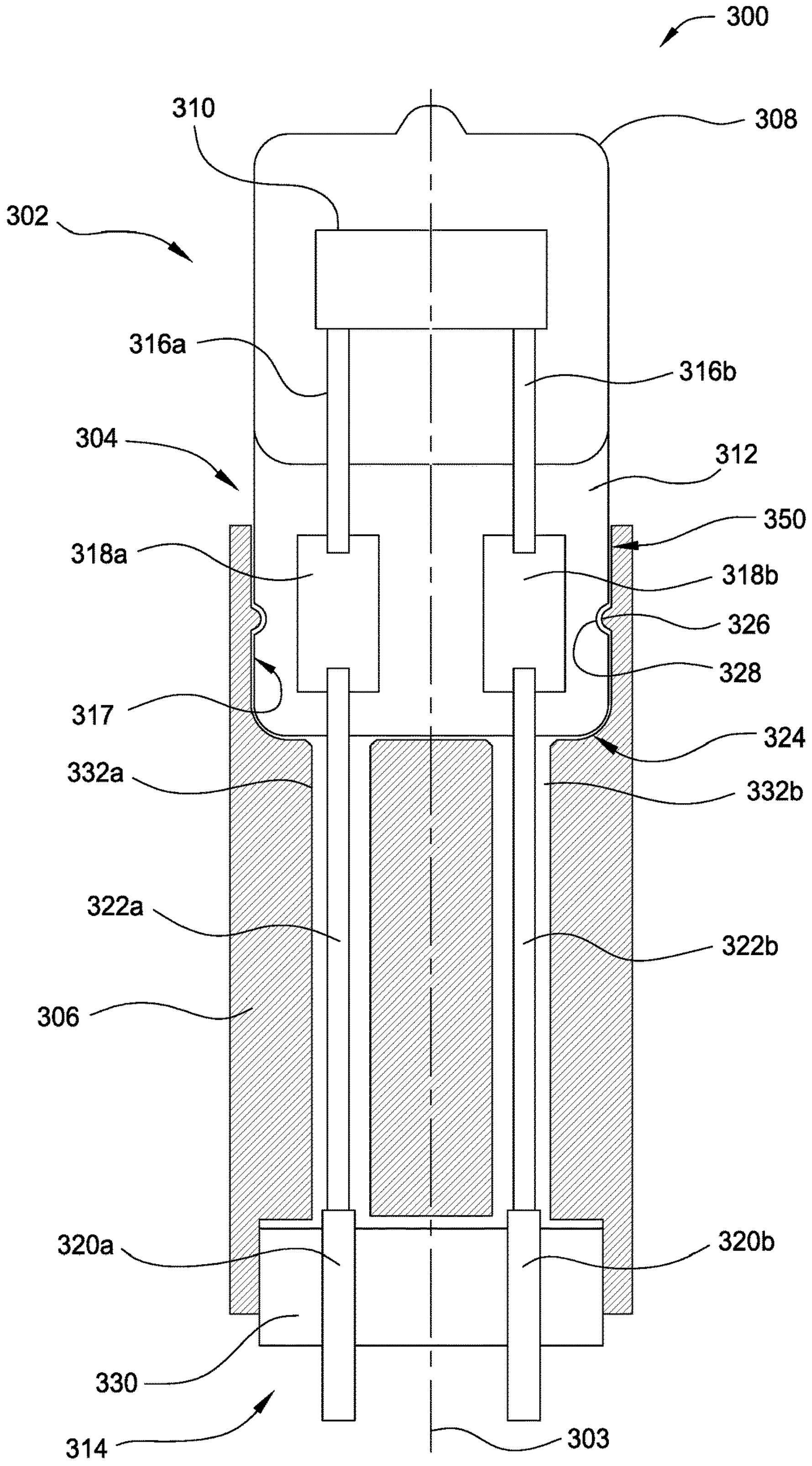
FIG. 3 is a schematic, cross-sectional view of a lamp assembly according to embodiments of the disclosure.

FIG. 3 is a schematic, cross-sectional view of a lamp assembly 300 according to embodiments of the disclosure for use in an RTP chamber, such as the RTP chamber 100. The lamp assembly 300 may be used in place of the lamp assembly 20 shown in FIG. 1. It should be noted that the concept and features described in FIG. 3 are equally applicable to various embodiments discussed in this disclosure. In general, the lamp assembly 300 includes a lamp element 302 and an adapter 306. The adapter 306 is configured to removably engage with the lamp element 302. The lamp element 302 and the adapter 306 in each lamp assembly 20 in the array 196 of lamp assemblies 20 (FIG. 1) are individually replaceable. When the bulb fails, rather than replacing an entire lamp assembly, only the lamp element of the lamp assembly that contains the faulty bulb is replaced. Therefore, the adapter can be reused. Making the adapter and the lamp element removable from each other and interchangeable in the lamp assembly reduces lamp replacement cost once the adapter is purchased.

The adapter 306 may have a general tubular or cylindrical body, or elongate body having some of its cross sectional periphery matching the cross sectional periphery of the lamp head where the lamp is normally inserted. The adapter 306 has a first end 304 and a second end 314 opposing the first end 304. The first end 304 of the adapter 306 has a receptacle 324 contoured to receive the bottom portion of the lamp element 302, for example the press seal 312. The lamp element 302 generally includes a light transmissive capsule 308 that contains a filament 310, and a press seal 312 coupling to the light transmissive capsule 308. The filament 310 electrically connects to metal foils 318*a*, 318*b* disposed within the press seal 312 by filament leads 316*a*, 316*b*, respectively. The press seal 312 encapsulates and creates a hermetic seal about the metal foils 318*a*, 318*b*. The metal foils 318*a*, 318*b* may extend out of the press seal 312. The metal foils 318*a*, 318*b* are in electrical communication with optional electrical connectors 320*a*, 320*b* via electrically conductive wires or leads 322*a*, 322*b* extending through the adapter 306. The adapter 306 have channels 332*a*, 332*b* configured to allow the passage of the electrically conductive wires or leads 322*a*, 322*b*. The channels 332*a*, 332*b* may extend from the receptacle 324 in a direction along a longitudinal axis 303 of the adapter. In some cases where the electrical conductors are sufficiently insulated and do not require additional cooling, the channels 332*a* and 332*b* may be connected to form one channel.

In some embodiments, the second end 314 of the adapter 306 may be sealed with a plug 330. The electrical connectors 320*a*, 320*b* extend through and out of the plug 330 to insert into respective electrically conductive receptacles 299 formed within the PCB structure 297 for distributing power to the filament 310. In some cases, the electrically conductive wires or leads 322*a*, 322*b* may connect to the electrical connectors 320*a*, 320*b* as shown in FIG. 3. If desired, the at least one of the electrically conductive wires or leads 322*a*, 322*b* of the lamp element 302 may have an engagement feature configured to be engaged with electrically conductive receptacles 299 formed within the PCB structure 297. Alternatively, the electrically conductive wires or leads 322*a*, 322*b* may include additional components to provide sufficient rigidity to the electrically conductive wires or leads 322*a*, 322*b*, as will be discussed in more detail below with respect to FIGS. 4A-4F. In such a case, the electrical connectors 320*a*, 320*b* may be omitted and the electrically conductive wires or leads with enhanced rigidity may be inserted into or engaged with respective electrically conductive receptacles 299 formed within the PCB structure 297.

The adapter 306 may have a mating extension 326 formed in the interior surface 317 of the receptacle 324. The lamp element 302, for example the press seal 312, may have a corresponding groove 328 formed in the exterior surface of the press seal 312. When the lamp element 302 engaged with the adapter 306, the mating extension 326 snaps into the groove 328 and locks them into place. Upon engagement of the adapter 306 and the lamp element 302, a portion or the entire press seal 312 is received within the receptacle 324. While not discussed, it is contemplated that the adapter 306 and the lamp element 302 may have any other suitable engagement features to allow easy, fast replacement and attachment of the adapter and/or the lamp element.

The height of the adapter 306 may vary depending upon the length of the lamp element 302 (i.e., capsule 308 and/or the press seal 312) and the configuration of thermal processing chamber. In certain types of thermal processing chamber, a constant distance is required between the lamp assembly and a chamber dome of the thermal processing chamber to provide uniform radiant heating of the substrate. In such a case, the adapter 306 may be made at a uniform size and configured to engage with the lamp element 302 at different heights. Alternatively, the adapter 306 may be made with different heights to engage with the lamp element 302 made with the same height. In various embodiments, the adapter 306 may have a height of about 5 mm to about 240 mm, such as about 8 mm to about 100 mm, for example about 10 mm to about 20 mm, about 20 mm to about 30 mm, about 30 mm to about 40 mm, about 40 mm to about 50 mm, about 50 mm to about 60 mm, about 60 mm to about 70 mm, about 70 mm to about 80 mm, about 80 mm to about 90 mm, about 90 mm to about 100 mm.

The adapter 306 may be made with a high thermal conductivity material such as a metal (e.g., copper, aluminum or stainless steel) or ceramic (e.g., aluminum nitride, silicon carbide, alumina, silicon nitride) to facilitate heat transfer between the lamp element 302 and the outside world. In one embodiment, aluminum is utilized for the cylindrical body surrounding the press seal 312 to increase the thermal conductivity of the adapter 306. In some embodiments, the top surface and/or interior surface 317 of the receptacle 324 may be contoured and coated to aid in directing radiation to the target in a controlled manner or modify the radiant heating of the adapter. For example, the interior surface 317 of the receptacle 324 may be made conical, cylindrical, hemispherical or arcuate in shape and coated with a light reflecting material such as aluminum, protected aluminum, gold or gold-plated aluminum, or even a diffuse reflective material such as titania, alumina, silica, zirconia, or hafnia. The top surface of the receptacle 324 described herein refers to the surface facing the bulb while the interior surface 317 refers to the surface in close proximity to the press seal 312. A gas gap 350 may be provided between the press seal 312 and the interior surface 317 of the adapter 306. The gas gap 350 serves as a cooling path to facilitate heat transfer from the lamp element 302 to the outside world. In one example, the gas gap 350 is about 0.005 mm to about 1 mm. The wall thickness of the adapter 306, particularly the wall surrounding the press seal 312, may be about 0.5 mm to about 30 mm. It should be noted that the wall thickness may vary for rectangular cross section press seals in circular cross section adapter.

To further increase the thermal conductivity of the cylindrical body surrounding the press seal 312, a higher thermal conductivity compound may be presented between the press seal 312 and the receptacle 324. In one embodiment, the thermal conductivity compound may have a thermal conductivity of about 1-2 W/(K-m) to about 150 W/(m-k) or higher, for example exceeding 200 W/(m-K). Some possible materials may include, but are not limited to $MgPO_4$, $ZrSiO_4$, $ZrO_2$, MgO, $Al_3N_4$, and $SiO_2$. The same thermal conductivity compound may also form on the exposed surfaces of the channels 332*a*, 332*b* to help cooling of the electrically conductive wires or leads 322*a*, 322*b* extending therethough. A combination of one or more of these approaches greatly facilitates transfer of heat away from the lamp bulb and lamp element to the cooling fluid flowing through the lamphead housing surrounding the plurality of lamp assemblies. In most cases, the temperature of the press seal 312 can be kept below about 350° C. As a result, bulb life of the lamp assembly is improved.

The lamp element 302 may or may not have a fuse (not shown) in the light transmissive capsule 308 or the press seal 312. The fuse is generally provided to limit arcing and potential explosion in the lamp during lamp failure. The fuse may be provided external to the light transmissive capsule 308 and the press seal 312 to prevent undesirable cracking or breaking of the capsule during lamp failure. In cases where the lamp element 302 is a simple capsule/fuse style (i.e., the adapter does not contain a fuse and the fuse is incorporated internal or external to the lamp element 302), the fuse can be replaced along with the lamp element 302. In cases where the lamp element 302 is a simple capsule style (i.e., the fuse is not used in the lamp element 302 and may be provided by the adapter), the adapter 306 may optionally provide a fuse to be connected to the electrically conductive wires or leads 322*a*, 322*b*. In this case, the lamp element may make electrical connection to receptacles inside the adapter rather than directly to the PCB. Also in this case the fuse can be made separated from the adapter 306 and be replaced through the side or the second end 314 or even the top of the adapter 306, as will be discussed in further detail below with respect to FIGS. 6A and 6B. In cases where the fuse is provided external to the light transmissive capsule 308 and the press seal 312, the lamp element 302 may include additional components to provide sufficient rigidity to the electrically conductive wires or leads 322*a*, 322*b* to absorb the compressive forces applied during insertion of the lamp assembly 300 into the PCB structure 297 (i.e., prevents the fuse from undergoing compression). Various components used to enhance rigidity of the electrically conductive wires or leads are discussed below with respect to FIGS. 4A-4F. In some embodiments, the fuse may be optionally incorporated in other parts of the circuit, e.g., the PCB board, and not required in the lamp element 302 or the adapter 306.

Exemplary Lamp Elements

FIGS. 4A-4F are schematic depictions of exemplary lamp element designs that may be used to engage with the adapter 306 according to embodiments of the disclosure. The lamp element 400 depicted in each of these Figures generally includes a quartz capsule 402 housing a tungsten filament 404. Tungsten leads 406*a*, 406*b* extend from the filament 404 and are each attached (e.g., welded) to molybdenum foil 408*a*, 408*b*. Molybdenum leads 410*a*, 410*b* are attached (e.g., welded) and extend from the molybdenum foil 408*a*, 408*b*. A quartz press seal 412 encapsulates and creates a hermetic seal about the molybdenum foil 408*a*, 408*b*. The molybdenum leads 410*a*, 410*b* extend out of the press seal 412.

Figure 4A:
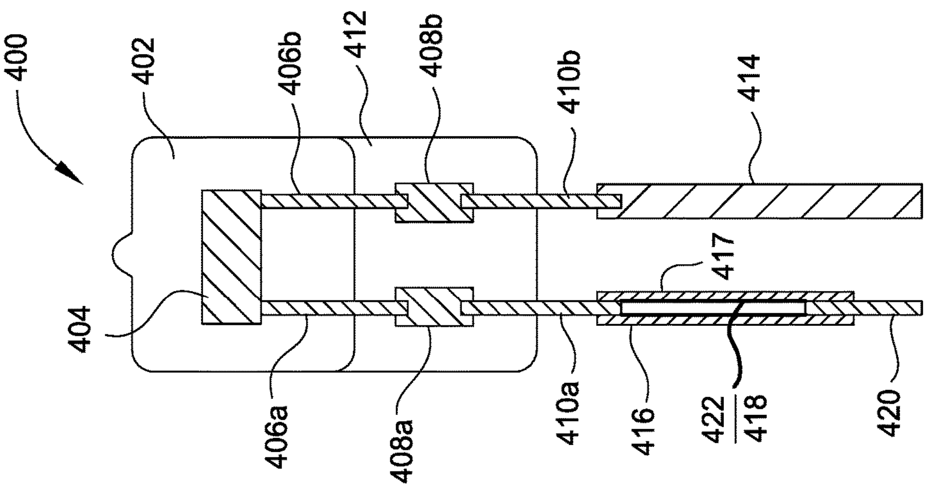
FIGS. 4A-4F are schematic depictions of exemplary lamp element designs that may be used to engage with an adapter according to embodiments of the disclosure.
Figure 4B:
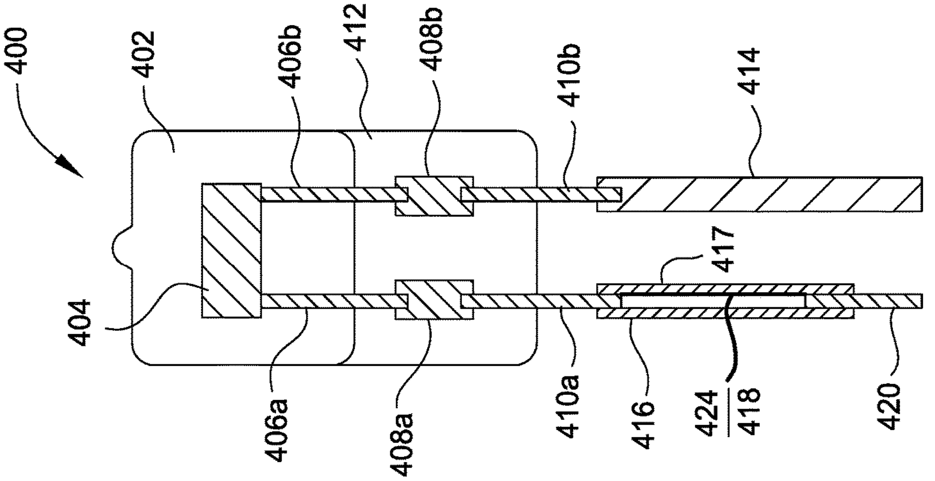
Figure 4C:
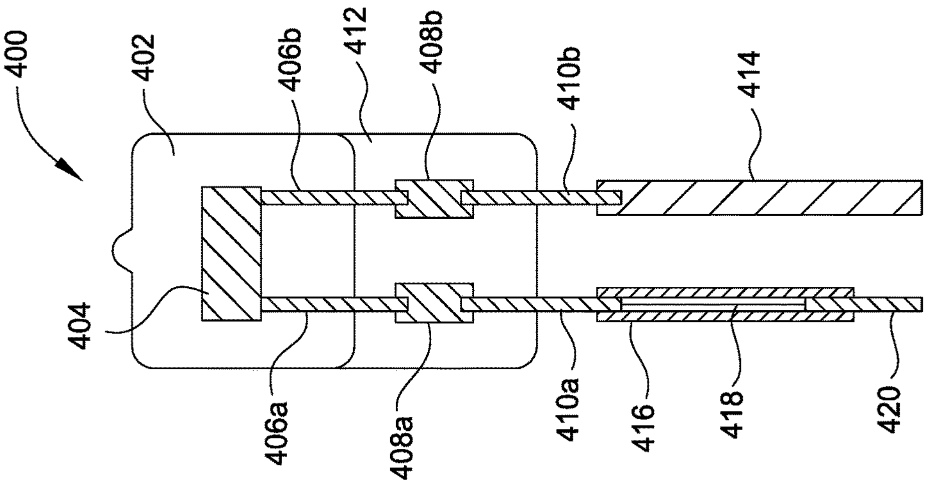

In each of the FIGS. 4A-4C, a conductive pin 414 is attached (e.g., welded) to the lead 410*b*. In addition, an insulative sleeve 416 (e.g., ceramic or plastic sleeve), a fuse 418, and a conductive pin 420 are attached to the lead 410*a*. The fuse 418 composition may be from the same family of metals used for lamp fuses, such as nickel, zinc, copper, silver, aluminum, and alloys thereof. Once the lamp element 400 is engaged with the adapter 306 (or various adapter designs shown in FIGS. 5 and 6A-6B), the conductive pin 414 and the conductive pin 420 extend through the channels 332*a*, 332*b* formed within the adapter 306 and are inserted into or engaged with respective electrically conductive receptacles 299 formed within the PCB structure 297 for connection to a power supply.

In the embodiment shown in FIG. 4A, the insulative sleeve 416 may have a thin metallic layer 422 deposited over the inner surface 417 of the sleeve 416. The equivalent cross-section of the metallic layer 422 (normal to the current flow) approximately corresponds to that of a fuse wire or ribbon designed for this application. Likewise the metallic layer 422 composition may be from the same family of metals used for lamp fuses, e.g., nickel, zinc, copper, silver, aluminum, and alloys thereof. The lead 410*a* and the conductive pin 420 are electrically connected to the metallic layer 422, e.g., soldered, brazed, interference fitted or compression fitted. The thin metallic layer 422 is constructed to act as the fuse 418.

In the embodiment shown in FIG. 4B, the insulative sleeve 416 may have a thin metallic trace 424 deposited along one side of the inner surface 417 of the sleeve 416. The lead 410*a* and the conductive pin 420 are fixed to the sleeve 416 in electrical contact with the trace 424, which acts as the fuse 418. The lead 410*a* and the conductive pin 420 may be attached to the sleeve 416 using a ceramic compound, a high temperature epoxy, a high temperature phenolic resin, or shrink tubing, for example. The trace 424 can be extended to cover the entire inner diameter for a short axial extent at the top and bottom of the insulative sleeve 416 to permit attachment of the sleeve 416 to the conductive pin 420 and the lead 410*a* by soldering or brazing.

In the embodiment shown in FIG. 4C, a wire fuse 418 is attached (e.g., welded, soldered) to the lead 410*a* and extends through the insulative sleeve 416. The fuse 418 is further attached (e.g., welded, soldered) to the conductive pin 420. The lead 410*a* and the conductive pin 420 may be attached to the sleeve 416 using a ceramic compound, a high temperature epoxy, a high temperature phenolic resin, or shrink tubing, for example. For any of the designs shown in FIGS. 4A, 4B, and 4C, the insulative sleeve 416 may be filled with low melting point glass beads or insulating particles to act as an arc quenching type fuse.

Therefore, each of the lamp elements 400 depicted in FIGS. 4A-4C provides for connection between the leads 410*a*, 410*b* and the conductive pins 414, 420 to be inserted into or engaged with the PCB structure 297 shown in FIG. 1, without requiring the use of ceramic potting compound or any thermal conductivity compound in the lamp elements 400 as opposed to prior art high voltage, tungsten halogen lamps. In most cases, the ceramic potting compound or thermal conductivity compound may be eliminated from the lamp assembly even after the lamp element 400 is engaged with the inventive adapter as discussed in FIGS. 3, 5 and 6. Once the lamp element 400 is engaged with the adapter (e.g., adapter 306 or various adapter designs shown in FIGS. 5 and 6A-6B), the insulative tube configuration can provide the rigidity to absorb the compressive forces applied during insertion of the conductive pins 414, 420 into the PCB structure 297.

Figure 4F:
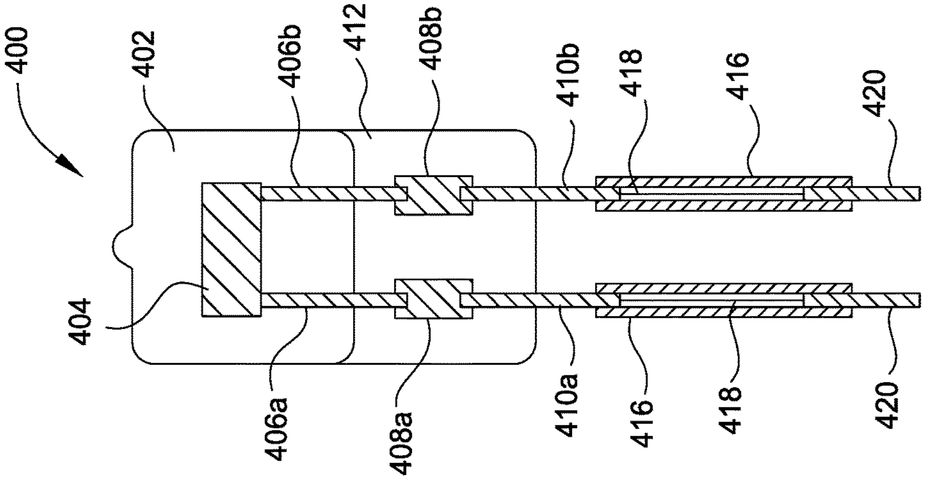
Figure 4E:
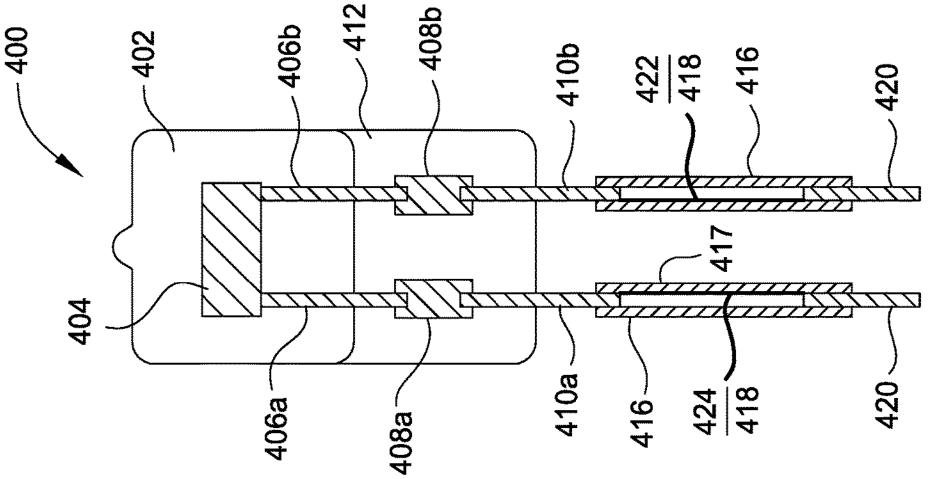
Figure 4D:
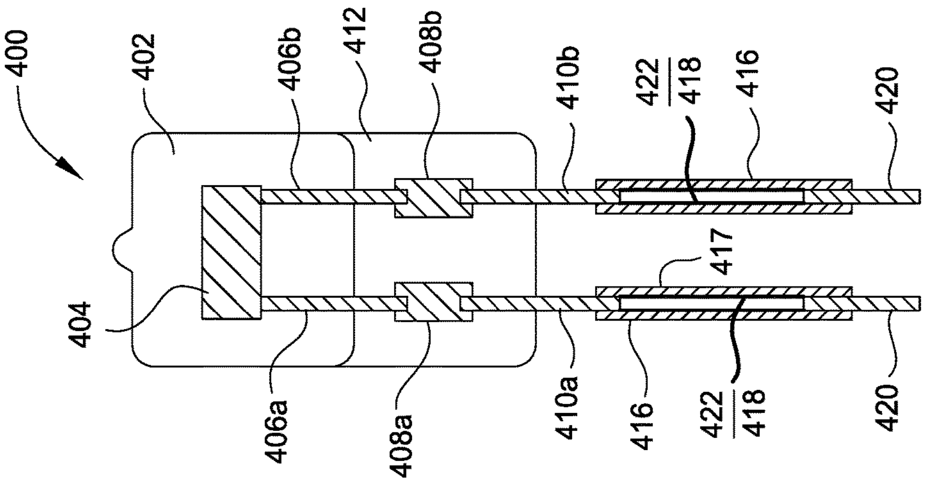

Although each of the FIGS. 4A-4C depicts a conductive pin 414 attached to the lead 410*b*, in embodiments shown in FIGS. 4D-4F, the lead 410*b* is attached to an additional insulative sleeve 416 (e.g., ceramic or plastic sleeve), an additional fuse 418, and an additional conductive pin 420 in the same manner as shown with regard to lead 410*a*. Additionally, each of the pins 414 and 420 may be configured to be compatible with mating receptacles 299 formed in the PCB structure 297.

Other suitable lamp elements that may be used to engage with the adapter 306 (or various adapter designs shown in FIGS. 5 and 6A-6B) are further described in U.S. Patent Application Ser. No. 61/787,805, filed on Mar. 15, 2013, entitled "SIMPLIFIED LAMP DESIGN," which is incorporated herein by reference in its entirety and for all purposes.

Figure 5:
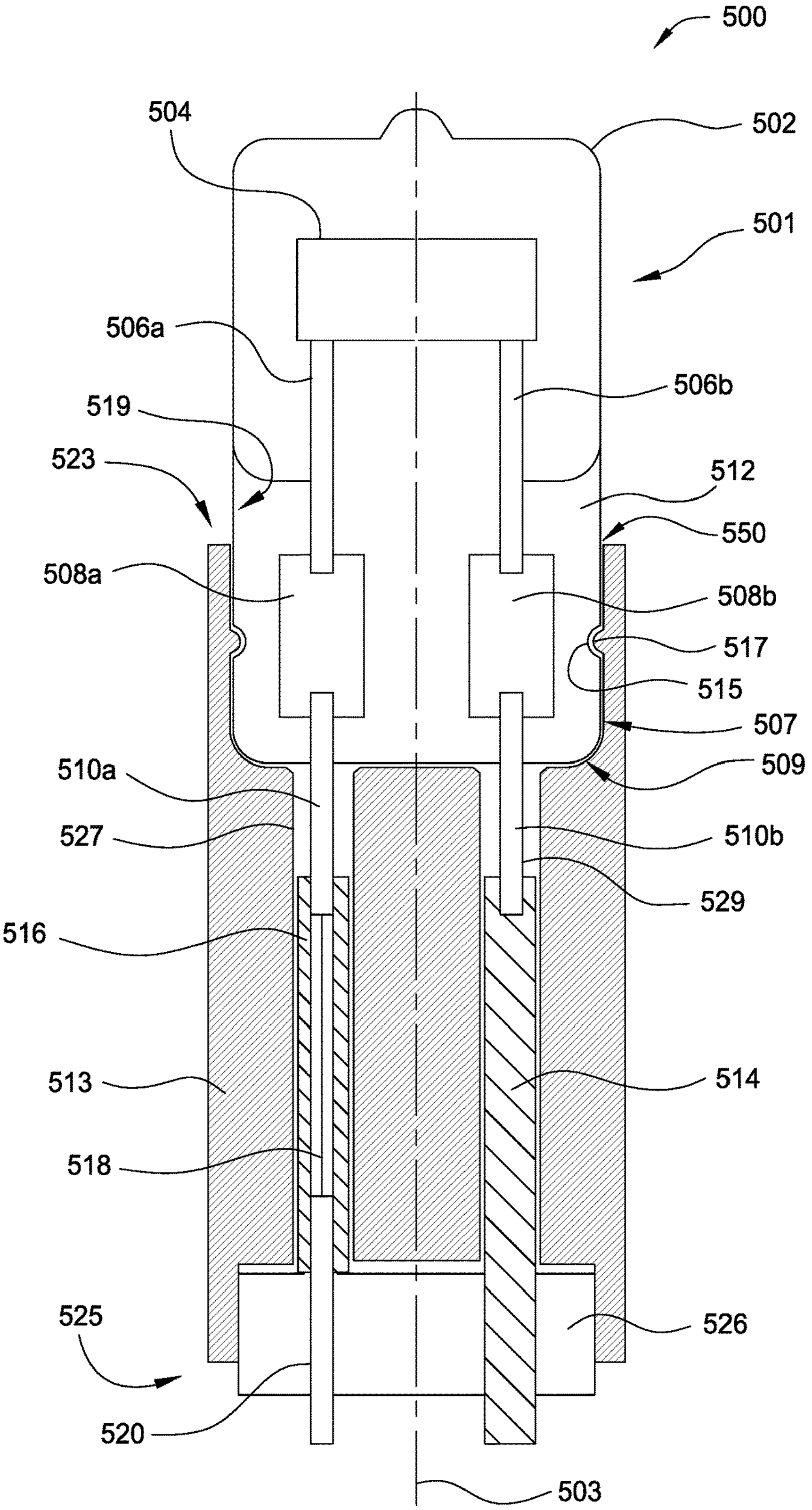
FIG. 5 is a front schematic, cross-sectional view of an exemplary lamp assembly according to embodiments of the disclosure.

FIG. 5 is a front schematic, cross-sectional view of an exemplary lamp assembly 500 according to embodiments of the disclosure for use in an RTP chamber, such as the RTP chamber 100. The lamp assembly 500 may be used in place of the lamp assembly 20 shown in FIG. 1. The lamp assembly 500 generally includes a lamp element 501 and an adapter 513. The lamp element 501 may be a simple capsule/fuse style, i.e., the adapter 513 does not contain a fuse and the fuse is made external to the lamp element 501. The lamp element 501 includes a capsule 502 housing a filament 504, and a press seal 512 coupling to the capsule 502. The capsule 502 may have a variety of shapes, including but not limited to tubular, conical, spherical, and multi-arcuate shapes. The press seal 512 may have a shape corresponding to that of the capsule 502 or may be in any shape to allow extension of filament leads 506*a*, 506*b* from the filament 504 to metal foils 508*a*, 508*b*. In one embodiment, the press seal 512 is of elongate substantially rectangular shape. Metal leads 510*a*, 510*b* are attached to (e.g., welded) and extended from the metal foil 508*a*, 508*b* through and outside of the press seal 512. The press seal 512 encapsulates and creates a hermetic seal about the metal foils 508*a*, 508*b*.

The adapter 513 may have a general tubular or cylindrical body having a first end 523 facing the press seal 512 and a second end 525 opposing the first end 523. The cylindrical body provides ease of manufacture, although other cross-sectional shapes, such as square, rectangular, triangular and multi-arcuate shapes, are possible. The adapter 513 may have channels 527, 529 configured to allow the passage of the metal leads 510*a*, 510*b*. Similar to the adapter 306 (FIG. 3), the adapter 513 is configured to removably engage with the press seal 512. The adapter 513 has a receptacle 509 contoured to receive at least a portion of the press seal 512. The receptacle 509 of the adapter 513 may have a mating extension 517 formed in its inner circumferential surface 507. The press seal 512 may have a corresponding groove 515 formed in its outer surface 519, such that when engaged, the mating extension 517 snaps into the groove 515, and locks them into place.

The adapter 513 may be made of thermal conductive material, for example a metallic material such as copper, aluminum, or stainless steel, to aid in conducting heat away from the lamp element 501. A gas gap 550 may be provided between the press seal 512 and the inner circumferential surface 507 of the adapter 513 to facilitate heat transfer from the lamp element 501 to the outside world. In one example, the gas gap 550 is about 0.005 mm to about 1 mm. Increasing the thickness of the cylindrical body without increasing the overall outer diameter of the adapter 513 may also improve transfer of heat away from the lamp element 501. In a non-limiting example the adapter 513 may have an outer diameter of about 2 mm to about 50 mm, for example about 10 mm to about 35 mm, and an inner diameter of about 1 mm to about 49 mm, for example about 9 mm to about 34 mm. The wall thickness of the adapter 513, particularly the wall surrounding the press seal 512, may be about 0.5 mm to about 30 mm. A higher thermal conductivity compound may be presented between the press seal 512 and the receptacle 509. In one embodiment, the thermal conductivity compound may have a thermal conductivity of about 1-2 W/(K-m) to about 150 W/(m-k) or higher, for example exceeding 200 W/(m-K). Some possible materials may include, but are not limited to $MgPO_4$, $ZrSiO_4$, $ZrO_2$, MgO, $Al_3N_4$, and $SiO_2$. The same thermal conductivity compound may also form on exposed surfaces of the channels 527, 529 to allow cooling of the metal leads 510*a*, 510*b* extending therethrough.

During process, most of the thermal energy is conducted away from the press seal 512 laterally (radially) through the gas gap 550, to the cylindrical body of the adapter 513 and then laterally to the cooling fluid that travels in the space 236 (FIG. 2) between the lamp assembly housings 204. In most cases, the temperature of the press seal 512 can be kept below about 350° C. As a result, bulb life of the lamp assembly is improved.

The lamp element 501 may or may not provide a fuse. FIG. 5 illustrates an embodiment where the fuse is provided external to the lamp capsule 502. In this embodiment, the metal leads 510*a*, 510*b* may include additional components as discussed above with respect to FIGS. 4A-4F to provide sufficient rigidity to the metal leads 510*a*, 510*b* to absorb the compressive forces applied during insertion of the lamp assembly 500 into the PCB structure 297 (i.e., prevents the fuse from undergoing compression). For example, the metal lead 510*b* may be connected to a conductive pin 514, which extends through the adapter 513 to be inserted into or engaged with the mating receptacle 299 formed in the PCB structure 297. In addition, an insulative sleeve 516 (e.g., ceramic or plastic sleeve), a fuse 518, and a conductive pin 520 may be attached to the metal lead 510*a*. The fuse 518 is provided to limit arcing and potential explosion in the lamp during lamp failure, and may be replaced along with the capsule 502 and the press seal 512. The fuse 518 composition may be from the same family of metals used for lamp fuses, e.g., nickel, zinc, copper, silver, aluminum, and alloys thereof. Once the lamp element 501 is engaged with the adapter 513, the conductive pin 514, the insulative sleeve 516, the fuse 518, and the conductive pin 520 provide a rigid, conductive extension for inserting the lamp assembly 500 into the printed circuit board (PCB) structure 297.

Optionally, the second end 525 of the adapter 513 may be sealed with a plug 526. The plug 526 is configured so that the conductive pins 514, 520 can pass therethough and engage with the mating receptacle 299 formed in the PCB structure 297. The plug 526 may be made of rigid or elastomeric material. The plug 526 may be fixed or flexibly positioned to allow movement relative to the second end 525 of the adapter 513 in a direction along a longitudinal axis 503 of the adapter 513, thereby accommodating any misalignment between the lamp assembly and electrical connectors formed in the PCB structure 297. The material of the plug 526 should withstand high temperatures, for example about 150° C.

Figure 6A:
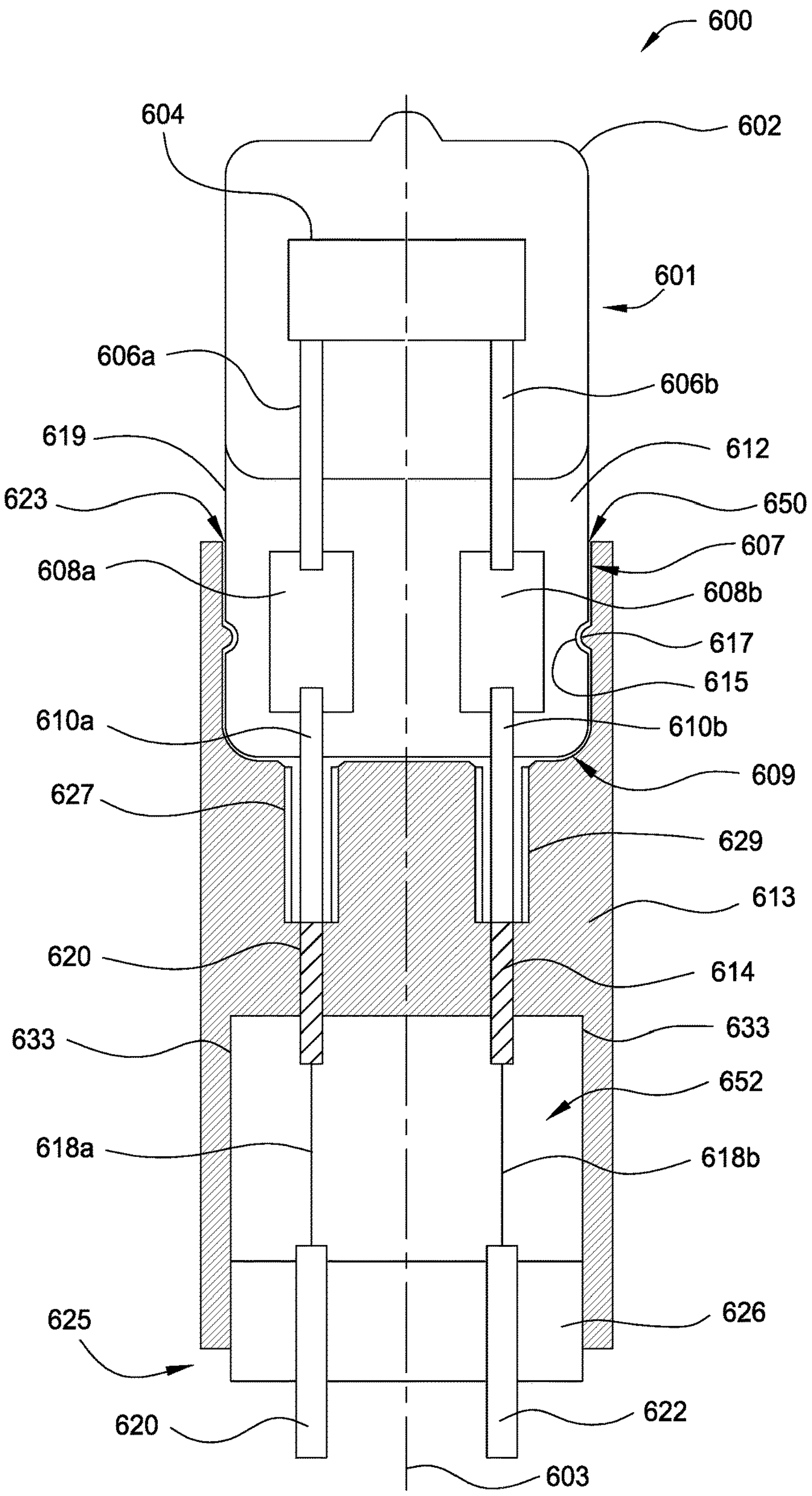
FIG. 6A is a schematic sectional view of an exemplary lamp assembly according to embodiments the disclosure.
Figure 6B:
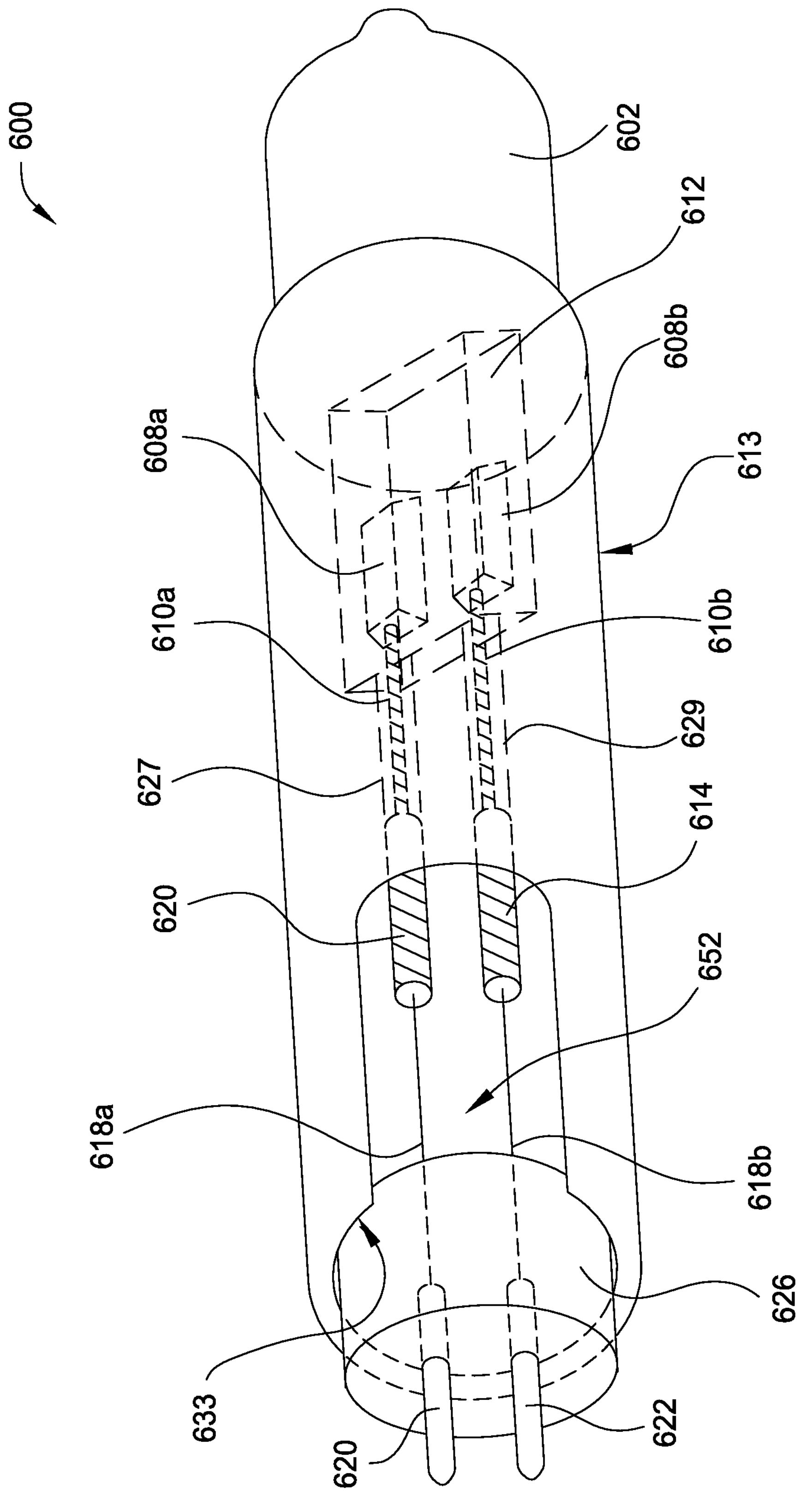
FIG. 6B is a schematic perspective view of FIG. 6A.

FIG. 6A depicts a schematic sectional view of an exemplary lamp assembly 600 according to another embodiment of the disclosure. FIG. 6B is a schematic perspective view of FIG. 6A. FIG. 6A is generally similar in concept to FIGS. 3 and 5 except that the adapter 613 is configured to provide with a fuse that can be replaced from the side or bottom of the adapter 613. The lamp assembly 600 generally includes a lamp element 601 and an adapter 613. The lamp element 601 may be a simple capsule style, i.e., the lamp element 601 does not contain a fuse and the fuse is provided by the adapter 613. The lamp element 601 includes a capsule 602 housing a filament 604, and a press seal 612 coupling to the capsule 602. The press seal 612 may be in any shape to allow extension of filament leads 606*a*, 606*b* from the filament 604 to metal foils 608*a*, 608*b*. In one embodiment, the press seal 612 is of elongate substantially rectangular shape (better seen in FIG. 6B). Metal leads 610*a*, 610*b* are attached to (e.g., welded) and extended from the metal foil 608*a*, 608*b* through and outside of the press seal 612. The press seal 612 encapsulates and creates a hermetic seal about the metal foils 608*a*, 608*b*.

The adapter 613 may have a general tubular or cylindrical body, or elongate body having some of its cross sectional periphery matching the cross sectional periphery of the lamp head where the lamp is normally inserted. The adapter 613 has a first end 623 facing the press seal 612 and a second end 625 opposing the first end 623. Similar to the adapter 306 (FIG. 3), the adapter 613 is configured to removably engage with the press seal 612. The adapter 613 may have a receptacle 609 contoured to receive at least a portion of the press seal 612. The adapter 613 may have sockets 627, 629 extending within the adapter 613 in a direction along a longitudinal axis 603 of the adapter 613. The sockets 627, 629 are configured to allow for the insertion of the metal leads 610*a*, 610*b*. In some embodiments, the sockets 627, 629 may incorporate retention feature to be engaged or disengaged with corresponding retention features provided on the metal leads 610*a*, 610*b*. The retention features disclosed in this disclosure may include laterally operative elements such as a contact spring, a spring-loaded member, a slider, a notch or groove, etc. The sockets 627, 629 may be in electrical connection with respective conductive pins 620, 614 formed through the adapter 613. The receptacle 609 of the adapter 613 may have a mating extension 617 formed in its inner circumferential surface 607. The press seal 612 may have a corresponding groove 615 formed in its outer surface 619, such that when engaged, the mating extension 617 snaps into the groove 615, and locks them into place.

To improve heat dissipation away from the lamp element 601, the adapter 613 may be made of thermal conductive material similar to the adapter 513. A gas gap 650 may be formed between the press seal 612 and the inner circumferential surface 607 of the adapter 613 to facilitate heat transfer from the lamp element 601 to the outside world. In one example, the gas gap 650 is about 0.005 mm to about 1 mm. Similarly, increasing the thickness of the cylindrical body without increasing the overall outer diameter of the adapter 613 may further improve transfer of heat away from the lamp element 601. In a non-limiting example the adapter 613 may have an outer diameter of about 2 mm to about 50 mm, for example about 10 mm to about 35 mm, and an inner diameter of about 1 mm to about 49 mm, for example about 9 mm to about 34 mm. The wall thickness of the adapter 613, particularly the wall surrounding the press seal 612, may be about 0.5 mm to about 30 mm. A higher thermal conductivity compound may be presented between the press seal 612 and the receptacle 609. In one embodiment, the thermal conductivity compound may have a thermal conductivity of about 1-2 W/(K-m) to about 150 W/(m-k) or higher, for example exceeding 200 W/(m-K). Some possible materials may include, but are not limited to $MgPO_4$, $ZrSiO_4$, $ZrO_2$, MgO, $Al_3N_4$, and $SiO_2$. In some cases for example in an electrical socket connection, the same or a different thermal conductivity compound may be formed on exposed surfaces of the sockets 627, 629 to allow cooling of the metal leads 610*a*, 610*b* extending therethrough.

During process, most of the thermal energy is conducted away from the press seal 612 laterally (radially) through the gas gap 650, to the cylindrical body of the adapter 613 and then laterally to the cooling fluid that travels in the space 236 (FIG. 2) between the lamp assembly housings 204. In most cases, the temperature of the press seal 612 can be kept below about 350° C. As a result, bulb life of the lamp assembly is improved.

In one embodiment, fuses 618*a*, 618*b* are electrically attached (e.g., welded) between the conductive pins 620, 614 and electrical connectors 620, 622. In another embodiment, either one of the fuses 618*a*, 618*b* may be replaced with a conductive wire or lead. The adapter 613 may provide one or more cut-outs 652 sized enough to allow access to fuses 618*a*, 618*b* for service through the cut-out 652 of the adapter 613. The cut-out 652 may be formed in the sidewall 633 of the cylindrical body of the adapter 613. Alternatively, the fuses 618*a*, 618*b* can be replaced through the second end 625 of the adapter 613. In certain embodiments where the lamp element 601 is operated at low voltage (e.g., 12 V), both fuses 618*a*, 618*b* may be replaced with conductive wire or lead, or the metal leads 610*a*, 610*b* can be simply extended through an optional plug 626 that seals the second end 625 of the adapter 613.

Once the lamp element 601 is engaged with the adapter 613, the conductive pin 620, 614 (or electrical connectors 620, 622 if used) of the lamp assembly 600 are then inserted into or engaged with respective electrically conductive receptacles 299 formed within the PCB structure 297 for connection to a power supply. It should be noted that in various embodiments of this disclosure, the lamp assembly 300 and 500 may directly connect the lamp element with the PCB structure while the lamp assembly 600 may include two sets of electrical connections: (1) PCB structure 297 to the lamp adapter, and (2) the lamp adapter to the lamp element. Alternatively, the lamp assembly may be configured to connect the lamp element directly with the PCB structure 297.

Embodiments of the lamp assembly discussed in FIGS. 3, 5 and 6A-6B may be beneficial to certain thermal processing chambers having an improved PCB structure configured to allow an easy, fast replacement of the lamp assembly, without moving the entire lamphead assembly or the PCB structure. For example, the PCB structure 297 may be provided with a plurality of openings (corresponding to the locations of the lamp assemblies) sized to allow the passage of the lamp assembly, such as lamp assemblies 300, 500, and 600, therethrough for fast lamp replacement and ease of service of the lamphead assembly. In such a case, the electrical connectors of the lamp assemblies 300, 500, and 600 may have electrical connection features configured in electrical communication with electrical contact terminals provided within or around the openings to securely position and power the lamps in the lamp assembly from a power source.

The PCB structure may be a single flat circuitry board, or consisted of multiple concentric ring-type circuitry boards configured in a stepped staircase fashion in accordance with the angle of the chamber dome so that a distance between the lamps and the chamber dome is kept constant. In either case, the lamp element may have the same general size and the height of the adapters may be gradually increased in a radially outward direction from the center of the PCB structure to the peripheral of the PCB structure, or vice versa (i.e., adapters made at same general size and lamp elements made at different heights). Exemplary PCB structure with openings and adapters with various electrical connection features are further described in U.S. Patent Application Ser. No. 61/907,847, filed on Nov. 22, 2013, entitled "EASY ACCESS LAMPHEAD," which is incorporated herein by reference in its entirety and for all purposes.

Benefits of the present disclosure include an easy, fast replacement of a lamp element by making the lamp element removably engaged with the adapter so that the lamp element and/or the adapter can be individually replaced. Making the adapter and the lamp element removable from each other and interchangeable in the lamp assembly reduces lamp replacement cost once the adapter is purchased. Depending upon the style of the lamp element, the adapter may provide an optional fuse which can be replaced from the side or bottom of the adapter. The adapter may provide a receptacle contoured and may be coated to aid in directing thermal radiation to the target in a controlled manner. The adapter may provide features and a cooling path to facilitate heat transfer from the lamp element to the outside world. As a result, the lamp can be operated with press seal temperature low enough to permit long lamp life.

While the foregoing is directed to embodiments of the present disclosure, other and further embodiments of the disclosure may be devised without departing from the basic scope thereof, and the scope thereof is determined by the claims that follow.

The invention claimed is:

1. A lamp assembly, comprising:

a lamp element comprising a first engagement feature;

a first conductive lead extending from the lamp element;

a second conductive lead extending from the lamp element;

an adapter comprising a second engagement feature operable to engage or disengage with the first engagement feature, the adapter having a receptacle contoured to receive a portion of the lamp element, the adapter having:

a first channel extending through the adapter and sized to allow the first conductive lead to pass through the first channel; and a second channel extending through the adapter and sized to allow the second conductive lead to pass through the second channel; and a first insulative sleeve having a first end attached to the first conductive lead and a second end attached to a first conductive pin, the first insulative sleeve extending through the first channel and having a first metallic trace deposited along a first side of an inner surface of the first insulative sleeve.

2. The lamp assembly of claim 1, further comprising:

a second insulative sleeve having a first end attached to the second conductive lead and a second end attached to a second conductive pin, the second insulative sleeve extending through the second channel and having a second metallic trace deposited along a first side of an inner surface of the second insulative sleeve.

3. The lamp assembly of claim 2, further comprising:

a third metallic trace deposited along a second side of the inner surface of the first insulative sleeve.

4. The lamp assembly of claim 3, further comprising:

a fourth metallic trace deposited along a second side of the inner surface of the second insulative sleeve.

5. The lamp assembly of claim 1, wherein the lamp element comprises:

a capsule having a filament disposed therein, the filament being in electrical communication with the first and second conductive leads, respectively; and a press seal extending from the capsule.

6. The lamp assembly of claim 5, wherein the first engagement feature is disposed on the press seal.

7. The lamp assembly of claim 5, wherein the receptacle has an interior surface coated with a light reflecting material.

8. The lamp assembly of claim 7, further comprising:

a gas gap provided between the press seal and the interior surface of the receptacle.

9. The lamp assembly of claim 2, wherein the first and second insulative sleeves are filled with low melting point glass beads or insulating particles.

10. A lamp assembly, comprising:

a lamp element comprising a first engagement feature;

a first conductive lead extending from the lamp element;

a second conductive lead extending from the lamp element;

an adapter comprising a second engagement feature operable to engage or disengage with the first engagement feature, the adapter having a receptacle contoured to receive a portion of the lamp element, the adapter having:

a first channel extending through the adapter and sized to allow the first conductive lead to pass through the first channel; and a second channel extending through the adapter and sized to allow the second conductive lead to pass through the second channel;

a first conductive pin coupled to the first conductive lead, the first conductive pin extending through the first channel;

an insulative sleeve having a first end attached to the second conductive lead and a second end attached to a second conductive pin, the insulative sleeve extending through the second channel; and a wire fuse disposed within the second channel, the wire fuse connecting the second conductive lead to the second conductive pin.

11. The lamp assembly of claim 10, wherein the lamp element comprises:

a capsule having a filament disposed therein, the filament being in electrical communication with the first and second conductive leads, respectively; and a press seal extending from the capsule.

12. The lamp assembly of claim 11, wherein the first engagement feature is disposed on the press seal.

13. The lamp assembly of claim 10, wherein the receptacle has an interior surface coated with a light reflecting material.

14. The lamp assembly of claim 10, wherein the insulative sleeve is filled with low melting point glass beads or insulating particles.

15. A processing chamber, comprising:

a housing enclosing a process zone;

a substrate support disposed within the process zone; and a lamp assembly, comprising:

a plurality of lamp elements, each comprising a first engagement feature;

a first conductive lead extending from the lamp element;

a second conductive lead extending from the lamp element;

an adapter comprising a second engagement feature operable to engage or disengage with the first engagement feature, the adapter having a receptacle contoured to receive a portion of the lamp element, the adapter having:

a first channel extending through the adapter and sized to allow the first conductive lead to pass through the first channel; and a second channel extending through the adapter and sized to allow the second conductive lead to pass through the second channel;

a first conductive pin coupled to the first conductive lead, the first conductive pin extending through the first channel;

an insulative sleeve having a first end attached to the second conductive lead and a second end attached to a second conductive pin, the insulative sleeve extending through the second channel; and a wire fuse disposed within the second channel and connecting the second conductive lead to the second conductive pin.

16. The processing chamber of claim 15, further comprising:

a window disposed between the substrate support and the lamp assembly.

17. The processing chamber of claim 15, wherein each lamp element of the plurality of lamp elements comprises:

a capsule having a filament disposed therein, the filament being in electrical communication with the first and second conductive leads, respectively; and a press seal extending from the capsule.

18. The processing chamber of claim 17, wherein the first engagement feature is disposed on the press seal.

19. The processing chamber of claim 15, wherein the receptacle has an interior surface coated with a light reflecting material.

20. The processing chamber of claim 15, wherein the insulative sleeve is filled with low melting point glass beads or insulating particles.

* * * * *